US009445295B2

(12) United States Patent
Takahashi et al.

(10) Patent No.: US 9,445,295 B2
(45) Date of Patent: Sep. 13, 2016

(54) MOBILE COMMUNICATION METHOD, RADIO BASE STATION AND MOBILE STATION

(71) Applicant: NTT DOCOMO, INC., Tokyo (JP)

(72) Inventors: Hideaki Takahashi, Tokyo (JP); Kazuaki Takeda, Tokyo (JP); Takeshi Nakamori, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/375,338

(22) PCT Filed: Jan. 30, 2013

(86) PCT No.: PCT/JP2013/052042
§ 371 (c)(1),
(2) Date: Jul. 29, 2014

(87) PCT Pub. No.: WO2013/115249
PCT Pub. Date: Aug. 8, 2013

(65) Prior Publication Data
US 2015/0029883 A1    Jan. 29, 2015

(30) Foreign Application Priority Data
Jan. 30, 2012   (JP) ................. 2012-017366

(51) Int. Cl.
| H04L 12/26 | (2006.01) |
| H04W 24/10 | (2009.01) |
| H04W 16/32 | (2009.01) |
| H04W 36/00 | (2009.01) |

(52) U.S. Cl.
CPC ............. *H04W 24/10* (2013.01); *H04W 16/32* (2013.01); *H04W 36/0088* (2013.01)

(58) Field of Classification Search
None
See application file for complete search history.

(56) References Cited

U.S. PATENT DOCUMENTS

| 2012/0115459 A1 | 5/2012 | Deng et al. |
| 2013/0029592 A1 | 1/2013 | Yuda |

(Continued)

FOREIGN PATENT DOCUMENTS

| JP | H08195711 A | 7/1996 |
| JP | 2009232124 A | 10/2009 |

(Continued)

OTHER PUBLICATIONS

International Search Report for corresponding International Application No. PCT/JP2013/052042, mailed May 7, 2013 (1 page).

(Continued)

*Primary Examiner* — Chi H Pham
*Assistant Examiner* — Fahmida Chowdhury
(74) *Attorney, Agent, or Firm* — Osha Liang LLP

(57) ABSTRACT

In current LTE, different measurement cycles of a measurement process are set for respective measurement frequencies. A mobile communication method according to the present invention includes: a step A of a radio base station eNB notifying a mobile station UE of a measurement cycle for "Inter-Frequency Measurement" for each measurement frequency; and a step B of the mobile station UE performing out a measurement process in each of cells #11A and #11B having frequencies f2 and f3 different from that of a cell #11 to which the mobile station UE is currently connected, on the basis of the measurement frequency and the measurement cycle for "Inter-Frequency Measurement".

11 Claims, 8 Drawing Sheets

(56) References Cited

U.S. PATENT DOCUMENTS

2013/0189971 A1* 7/2013 Callender ......... H04W 36/0094
455/423
2014/0044003 A1* 2/2014 Drazynski ............ H04W 24/10
370/252

FOREIGN PATENT DOCUMENTS

| JP | 2011142596 A | 7/2011 |
|---|---|---|
| JP | 2011239465 A | 11/2011 |
| WO | 2010/142150 A1 | 12/2010 |
| WO | 2011/129231 A1 | 10/2011 |

OTHER PUBLICATIONS

NTT Docomo, Inc.; "Inter-frequency Pico cell measurements for Hetnet deployments;" 3GPP TSG-RAN WG2 #76, R2-115745; San Francisco, USA; Nov. 14-18, 2011 (4 pages).

3GPP TS 36.133 V8.15.0; "3rd Generation Partnership Project; Technical Specification Group Radio Access Network; Evolved Universal Terrestrial Radio Access (E-UTRA); Requirements for support of radio resource management (Release 8);" Sep. 2011 (340 pages).

3GPP TS 36.211 V10.4.0; "3rd Generation Partnership Project; Technical Specification Group Radio Access Network; Evolved Universal Terrestrial Radio Access (E-UTRA); Physical Channels and Modulation (Release 10);" Dec. 2011 (101 pages).

3GPP TS 36.331 V11.1.0; "3rd Generation Partnership Project; Technical Specification Group Radio Access Network; Evolved Universal Terrestrial Radio Access (E-UTRA); Radio Resource Control (RRC); Protocol specification (Release 11);" Sep. 2012 (325 pages).

Extended European Search Report issued in the counterpart European Patent Application No. 13743338.9, mailed Oct. 6, 2015 (13 pages).

3GPP TS 36.331 V10.4.0 (2011-2012); "3rd Generation Parternship Project; Technical Specification Group Radio Access Network; Evolved Universal Terrestrial Radio Access (E-UTRA); Radio Resource Control (RRC); Protocol Specification (Release 10)"; 3GGP Standard; 3GGP TS 36.331, 3rd Generation Partnership Project (3GPP), Mobile Competence Center; 650, Route Des Lucioles; F-06921 Sophia-Antipolis Cedex, France; vol. RAN WG2, No. V10.4.0; Dec. 20, 2011, (296 pages).

3GPP TSG-RAN WG2 Meeting #76; Nokia Siemens Networks, Nokia Corporation: "Small cell detection in HetNet environment", 3GPP Draft; R2-116151 Small Cell Detection, 3rd Generation Partnership Project (3GPP), Mobile Competence Center; 650, Route Des Lucioles; F-06921 Sophia-Antipolis Cedex, France; vol. RAN WG2; San Francisco, USA; Nov. 8, 2011 (8 pages).

Notification of Reasons for Refusal issued in the counterpart Japanese Patent Application No. 2012-017366, mailed Aug. 25, 2015 (6 pages).

Notification of Reasons for Refusal issued in the counterpart Japanese Patent Application No. 2012-017366, mailed Jan. 19, 2016 (6 pages).

* cited by examiner

FIG. 4

MeasObjectEUTRA information element

```
-- ASN1START
MeasObjectEUTRA ::=             SEQUENCE {
    carrierFreq                     ARFCN-ValueEUTRA,
    allowedMeasBandwidth            AllowedMeasBandwidth,
    presenceAntennaPort1            PresenceAntennaPort1,
    neighCellConfig                 NeighCellConfig,
    offsetFreq                      Q-OffsetRange                       DEFAULT dB0,
    -- Cell list
    cellsToRemoveList               CellIndexList                       OPTIONAL,       -- Need ON
    cellsToAddModList               CellsToAddModList                   OPTIONAL,       -- Need ON
    -- Black list
    blackCellsToRemoveList          CellIndexList                       OPTIONAL,       -- Need ON
    blackCellsToAddModList          BlackCellsToAddModList              OPTIONAL,       -- Need ON
    cellForWhichToReportCGI         PhysCellId                          OPTIONAL,       -- Need ON
    ...,
    [[measCycleSCell-r10            MeasCycleSCell-r10                  OPTIONAL,       -- Need ON
    measSubframePatternConfigNeigh-r10  MeasSubframePatternConfigNeigh-r10  OPTIONAL
    -- Need ON
    ]]
    [[measGapConfig                 MeasGapConfig                       OPTIONAL,       -- Need ON
    ]]
}
CellsToAddModList ::=           SEQUENCE (SIZE (1..maxCellMeas)) OF CellsToAddMod
CellsToAddMod ::=               SEQUENCE {
    cellIndex                       INTEGER (1..maxCellMeas),
    physCellId                      PhysCellId,
    cellIndividualOffset            Q-OffsetRange
}
BlackCellsToAddModList ::=      SEQUENCE (SIZE (1..maxCellMeas)) OF BlackCellsToAddMod
BlackCellsToAddMod ::=          SEQUENCE {
    cellIndex                       INTEGER (1..maxCellMeas),
    physCellIdRange                 PhysCellIdRange
}
MeasCycleSCell-r10 ::=          ENUMERATED {sf160, sf256, sf320, sf512,
                                            sf640, sf1024, sf1280, spare1}
MeasSubframePatternConfigNeigh-r10 ::=  CHOICE {
    release                         NULL,
    setup                           SEQUENCE {
        measSubframePatternNeigh-r10    MeasSubframePattern-r10,
        measSubframeCellList-r10        MeasSubframeCellList-r10 OPTIONAL-- Cond measSubframe
    }
}
MeasSubframeCellList-r10 ::=SEQUENCE (SIZE (1..maxCellMeas)) OF PhysCellIdRange
-- ASN1STOP
```

FIG. 5

MeasGapConfig information element

```
-- ASN1START
MeasGapConfig ::=        CHOICE {
    release                  NULL,
    setup                    SEQUENCE {
        gapOffset                CHOICE {
            gp0                      INTEGER (0..39),
            gp1                      INTEGER (0..79),
            gp2
            ...
        }
    }
}
-- ASN1STOP
```

| MeasGapConfig field descriptions |
|---|
| gapOffset<br>Value *gapOffset* of *gp0* corresponds to gap offset of Gap Pattern Id "0" with MGRP = 40ms, *gapOffset* of *gp1* corresponds to gap offset of Gap Pattern Id "1" with MGRP = 80ms. Also used to specify the measurement gap pattern to be applied, as defined in TS 36.133 [16]. |

FIG. 6

Table 8.1.2.1-1: Gap Pattern Configurations supported by the UE

| Gap Pattern Id | MeasurementGap Length (MGL, ms) | Measurement Gap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 6 | 1000 | | |

FIG. 8

MeasObjectEUTRA information element

```
-- ASN1START
MeasObjectEUTRA ::=        SEQUENCE {
    carrierFreq                 ARFCN-ValueEUTRA,
    allowedMeasBandwidth        AllowedMeasBandwidth,
    presenceAntennaPort1        PresenceAntennaPort1,
    neighCellConfig             NeighCellConfig,
    offsetFreq                  Q-OffsetRange               DEFAULT dB0,
    -- Cell list
    cellsToRemoveList           CellIndexList                                           OPTIONAL,    -- Need ON
    cellsToAddModList           CellsToAddModList                                       OPTIONAL,    -- Need ON
    -- Black list
    blackCellsToRemoveList      CellIndexList                                           OPTIONAL,    -- Need ON
    blackCellsToAddModList      BlackCellsToAddModList                                  OPTIONAL,    -- Need ON
    cellForWhichToReportCGI     PhysCellId                                              OPTIONAL,    -- Need ON
    ...,
    [[ measCycleSCell-r10       MeasCycleSCell-r10          OPTIONAL,   -- Need ON
       measSubframePatternConfigNeigh-r10   MeasSubframePatternConfigNeigh-r10    OPTIONAL
    -- Need ON
    ]]
}
CellsToAddModList ::=       SEQUENCE (SIZE (1..maxCellMeas)) OF CellsToAddMod
CellsToAddMod ::=           SEQUENCE {
    cellIndex                   INTEGER (1..maxCellMeas),
    physCellId                  PhysCellId,
    cellIndividualOffset        Q-OffsetRange
}
BlackCellsToAddModList ::=  SEQUENCE (SIZE (1..maxCellMeas)) OF BlackCellsToAddMod
BlackCellsToAddMod ::=      SEQUENCE {
    cellIndex                   INTEGER (1..maxCellMeas),
    physCellIdRange             PhysCellIdRange
}
MeasCycleSCell-r10 ::=      ENUMERATED {sf160, sf256, sf320, sf512,
                                        sf640, sf1024, sf1280, spare1};
MeasSubframePatternConfigNeigh-r10 ::= CHOICE {
    release                     NULL,
    setup                       SEQUENCE {
        measSubframePatternNeigh-r10    MeasSubframePattern-r10,
        measSubframeCellList-r10        MeasSubframeCellList-r10    OPTIONAL    -- Cond measSubframe
    }
}
MeasSubframeCellList-r10 ::= SEQUENCE (SIZE (1..maxCellMeas)) OF PhysCellIdRange
-- ASN1STOP
```

*measCycleSCell*
Parameter: $T_{measure\_sc}$. See TS 36.133 [16, 8.3.3]. The parameter is used only when an SCell is configured on the frequency indicated by the *measObject* and is in deactivated state, but the field may also be signalled when an SCell is not configured. Value *sf160* corresponds to 160 sub-frames, *sf256* corresponds to 256 sub-frames and so on.

MOBILE COMMUNICATION METHOD, RADIO BASE STATION AND MOBILE STATION

TECHNICAL FIELD

The present invention relates to a mobile communication method, a radio base station and a mobile station.

BACKGROUND ART

In LTE (Long Term Evolution), it has been considered to dispose cells (e.g., cells #11A and #11B), which are each operated by a capacity band for improving the throughput in a hot spot, in a coverage area of a cell (e.g., a cell #11) operated by a coverage band supporting a wide area, as shown in FIG. 1.

In such an environment, as shown in FIG. 2, a mobile station UE in "RRC_Connected state" in the cell #11 operated in a frequency f1 is expected to perform "Inter-Frequency Measurement" in the cells #11A and #11B disposed in the coverage area of the cell #11, in order to determine whether or not the cells #11A and #11B can be added as Scells in CA (Carrier Aggregation).

PRIOR ART DOCUMENT

Non-Patent Document

Non-patent document 1: 3GPP contributed article R2-115745
Non-patent document 2: 3GPP TS36.133

SUMMARY OF THE INVENTION

However, current LTE has a problem that a mobile station UE needs to perform "Inter-Frequency Measurement" in the cells #11A and #11B always while being located in the coverage area of the cell #11, even though the coverage areas of the cells #11A and #11B are generally much smaller than that of the cell #11.

Also, the performance in "Inter-Frequency Measurement" of current LTE is specified such that a measurement cycle becomes longer proportional to the number of measurement frequencies.

Furthermore, in a FDD mode of LTE, the number of different frequencies that can be measured by a mobile station UE is specified as a maximum of three carriers (a maximum of four carriers in a TDD mode of LTE).

When multiple cells (macrocells) are operated by coverage bands and also multiple cells (hot-spot cells) are operated by capacity bands, it is anticipated that continuous measurement of the hot-spot cells by the mobile station UE always takes place. In this case, macrocells are measured at long measurement intervals and the quality of handover between macrocells deteriorates.

Moreover, there is also a concern that the number of different frequencies that can be measured by a mobile station UE, which is specified as a maximum of three carriers in the FDD mode of LTE (a maximum of four carriers in the TDD mode of LTE) becomes insufficient in future operations.

The present invention has been made in view of the above-mentioned problem. An objective of the present invention is to provide a mobile communication method, a radio base station and a mobile station, capable of setting different measurement cycles of a measurement process for respective measurement frequencies in current LTE.

A first feature of the present invention is summarized as a mobile communication method including: a step A of a radio base station notifying a mobile station of a measurement cycle for inter-frequency measurement for each measurement frequency; and a step B of the mobile station performing a measurement process in a cell having a frequency different from that of a cell to which the mobile station is currently connected, based on the measurement frequency and the measurement cycle for inter-frequency measurement.

A second feature of the present invention is summarized as a radio base station including: a transmitter unit configured to notify a mobile station of a measurement cycle for inter-frequency measurement for each measurement frequency.

A third feature of the present invention is summarized as a mobile station including: a receiver unit configured to acquire a measurement cycle for inter-frequency measurement for each measurement frequency from a radio base station; and a measurement unit configured to perform a measurement process in a cell having a frequency different from that of a cell to which the mobile station is currently connected, based on the measurement frequency and the measurement cycle for inter-frequency measurement.

BRIEF DESCRIPTION OF THE DRAWINGS

FIG. 4 is a diagram showing an example of a format of "MeaaObjectEUTRA" transmitted by the radio base station according to the first embodiment of the present invention.

FIG. 5 is a diagram showing an example of a format of "MeasGapConfig" included in "MeaaObjectEUTRA" transmitted by the radio base station according to the first embodiment of the present invention.

FIG. 6 is a diagram showing an example of values that can be set as "MeasGapConfig" included in "MeaaObjectEUTRA" transmitted by the radio base station according to the first embodiment of the present invention.

FIG. 8 is a diagram showing an example of "MeaaObjectEUTRA" transmitted by a radio base station according to Modified Example 1 of the present invention.

MODE FOR CARRYING OUT THE INVENTION

Mobile Communication System According to First Embodiment of the Invention

With reference to FIGS. 1 to 7, a mobile communication system according to a first embodiment of the present invention is described.

Figure 1:
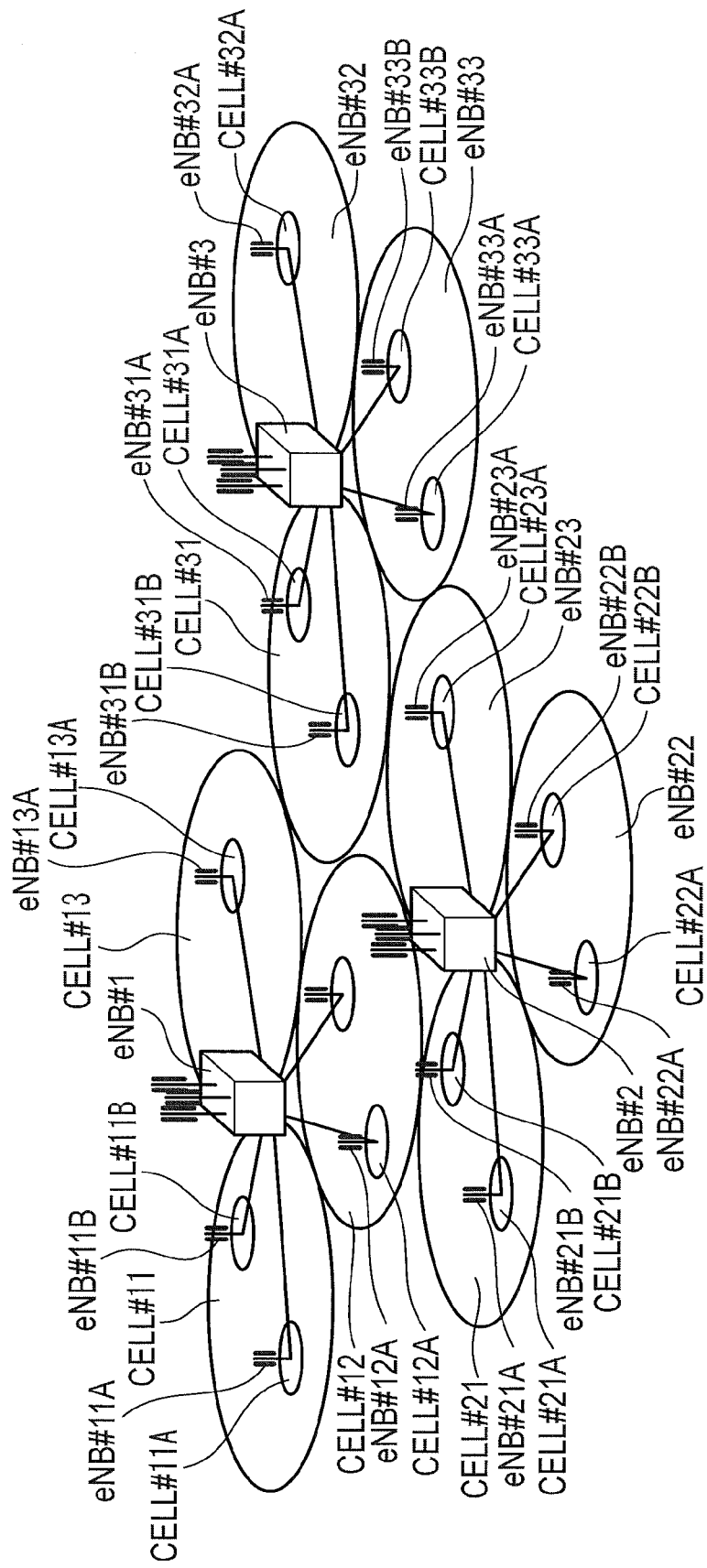
FIG. 1 is an overall configuration diagram of a mobile communication system according to a first embodiment of the present invention.

As shown in FIG. 1, the mobile communication system according to this embodiment supports LTE-Advanced, and is configured to be able to perform "Inter-band CA" using a Pcell and Scells operated by carriers in different frequency bands.

Note that the mobile communication system according to this embodiment may be configured to be able to perform "Inter-band CA" using a Pcell and Scells operated by carriers in the same frequency band.

As shown in FIG. 1, in the mobile communication system according to this embodiment, radio base stations eNB#1 to eNB#3 manages cells #11 to #33 and cells #11A to #33B.

Here, the cells #11 to #33 are cells (e.g., macrocells) operated by a coverage band supporting a wide area, for example, by a carrier of a frequency f1 (PCC: Primary Component Carrier).

On the other hand, the cells #11A to #33B are cells (e.g., picocells or hot-spot cells) disposed within coverage areas of the cells #11 to #33 and operated by capacity bands for improving the throughput in hot spots, for example, by carriers of frequencies f2 and f3 (SCC: Secondary Component Carrier).

Figure 2:
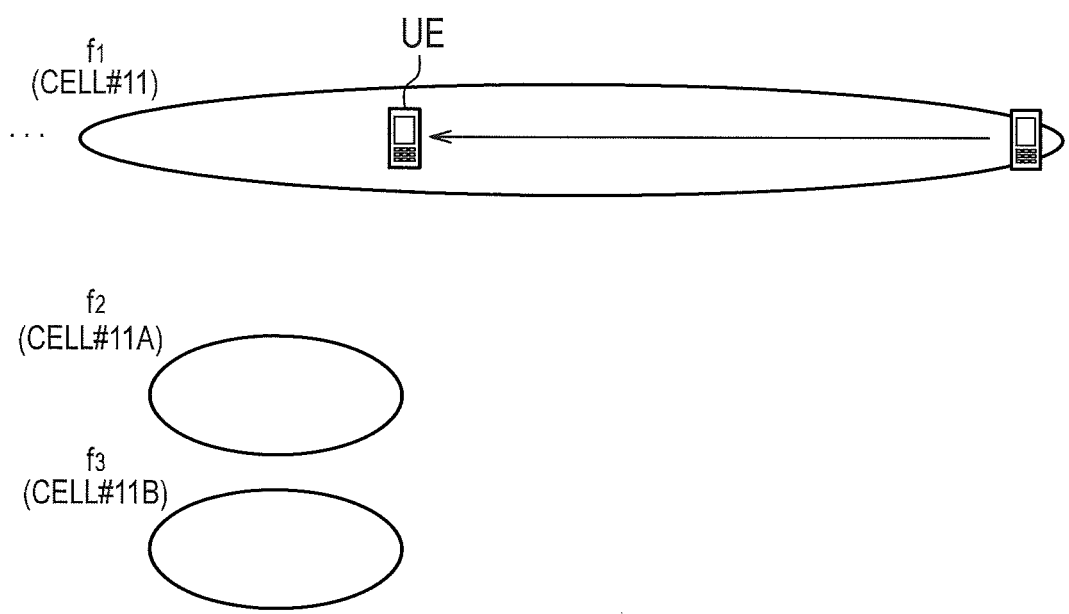
FIG. 2 is a diagram for explaining measurement processing performed by a mobile station in the mobile communication system according to the first embodiment of the present invention.

For example, as shown in FIG. 2, when being in "RRC_Connected state" in the cell #11 operated in the frequency f1, a mobile station UE is configured to perform "Inter-Frequency Measurement" in the cells #11A and #11B disposed in the coverage area of the cell #11 according to an instruction from the radio base station eNB#1.

Figure 3:
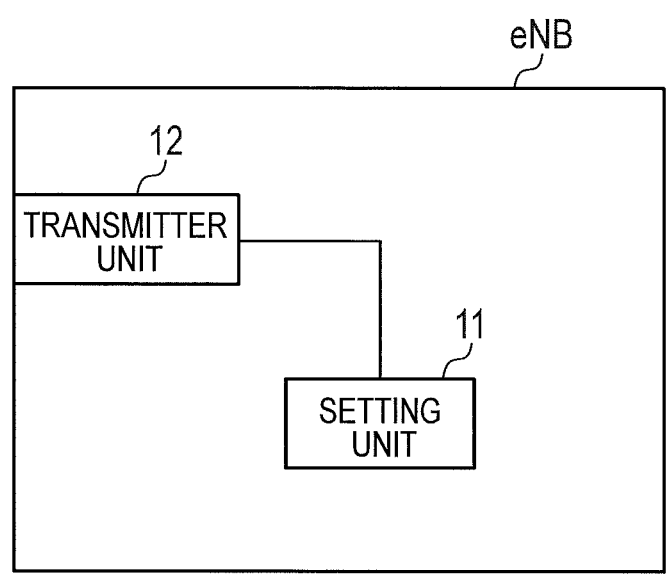
FIG. 3 is a functional block diagram of a radio base station according to the first embodiment of the present invention.

As shown in FIG. 3, the radio base station eNB according to this embodiment includes a setting unit 11 and a transmitter unit 12.

The setting unit 11 is configured to set a measurement cycle for "Inter-Frequency Measurement" to be notified to the mobile station UE.

Here, the setting unit 11 is configured to be able to set the measurement cycle for "Inter-Frequency Measurement" for each measurement frequency.

For example, as shown in FIGS. 4 and 5, the setting unit 11 may be configured to be able to set the measurement cycle for "Inter-Frequency Measurement" by setting "Gap Pattern Id" shown in FIG. 6 for "measGapConfig" in "MeasObjectEUTRA" in "Measurement Configuration".

Also, the setting unit 11 may be configured to set the measurement cycle for "Inter-Frequency Measurement" for hot-spot cells for each (e.g., f2 or f3) of measurement frequencies operated in the hot-spot cells (e.g., the cells #11A and #11B) for the mobile station UE in a state where no Scell is set.

The transmitter unit 12 is configured to transmit various signals to the mobile station UE. For example, the transmitter unit 12 may be configured to transmit "RRC Reconfiguration" to the mobile station UE, "RRC Reconfiguration" including "Measurement Configuration" set by the setting unit 11.

Also, the transmitter unit 12 may be configured to notify the mobile station UE in the state where no Scell is set of the measurement cycle for "Inter-Frequency Measurement" for hot-spot cells for each (e.g., f2 or f3) of measurement frequencies operated in the hot-spot cells (e.g., the cells #11A and #11B).

Note that the transmitter unit 12 is configured to notify the mobile station UE of a common measurement cycle for "Inter-Frequency Measurement" as specified in existing LTE.

Figure 7:
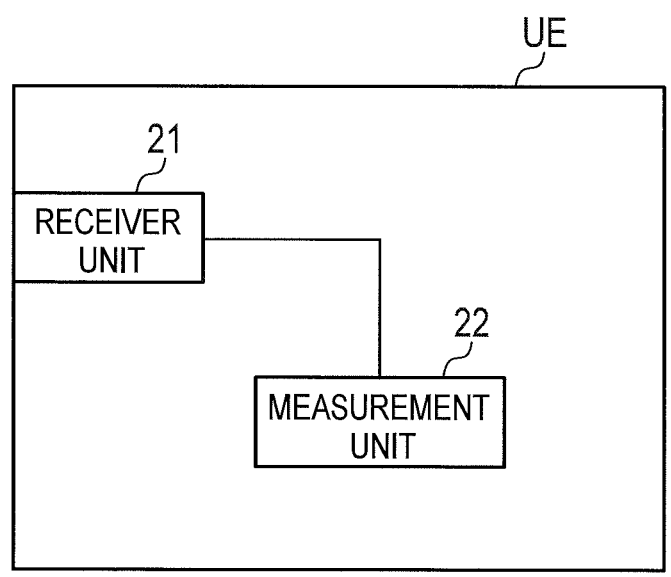
FIG. 7 is a functional block diagram of a mobile station according to the first embodiment of the present invention.

As shown in FIG. 7, the mobile station UE according to this embodiment includes a receiver unit 21 and a measurement unit 22.

The receiver unit 21 is configured to receive various signals transmitted by the radio base station eNB.

For example, the receiver unit 21 may be configured to receive "RRC Reconfiguration" including "Measurement Configuration" from the radio base station eNB.

Here, the receiver unit 21 may be configured to acquire the measurement cycle for "Inter-Frequency Measurement" from "measGapConfig" in "MeasObjectEUTRA" in "Measurement Configuration" received.

When no Scell is set for the mobile station UE, for example, the receiver unit 21 may be configured to acquire the measurement cycle for "Inter-Frequency Measurement" for hot-spot cells, from the radio base station eNB, for each (e.g., f2 or f3) of measurement frequencies operated in the hot-spot cells (e.g., the cells #11A and #11B).

Also, the receiver unit 21 may be configured to acquire a common measurement cycle for "Inter-Frequency Measurement" from the radio base station eNB as specified in existing LTE.

The measurement unit 22 is configured to perform a measurement process based on the received "Measurement Configuration".

For example, the measurement unit 22 may be configured to perform a measurement process in the cells #11A and #11B having frequencies f2 and f3 different from that of the cell #11 to which the mobile station UE is currently connected, based on the measurement cycle for "Inter-Frequency Measurement" acquired by the receiver unit 21 for each measurement frequency specified by "MeasObjectEUTRA".

Here, the measurement unit 22 may be configured to perform a measurement process in the macrocell (e.g., the cell #11) to which the mobile station UE is currently connected, based on the common measurement cycle for "Inter-Frequency Measurement", and also to perform a measurement process in the hot-spot cell (e.g., the cell #11A or #11B) different from the macrocell (e.g., the cell #11) based on the measurement cycle for "Inter-Frequency Measurement" for the hot-spot cell.

Note that, when the receiver unit 21 acquires no measurement cycle for "Inter-Frequency Measurement" for hot-spot cells, the measurement unit 22 may be configured to perform a measurement process in the hot-spot cell (e.g., the cell #11A or #11B) different from the macrocell (e.g., the cell #11) to which the mobile station UE is currently connected, based on the common measurement cycle for "Inter-Frequency Measurement".

The invention according to this embodiment enables the measurement cycle for "Inter-Frequency Measurement" to be set for each measurement target, using "measGapConfig" in "MeasObjectEUTRA" in "Measurement Configuration". Thus, in an environment as shown in FIG. 1, an appropriate measurement cycle for "Inter-Frequency Measurement" can be acquired while avoiding waste of a battery of the mobile station UE by setting the measurement cycle for "Inter-Frequency Measurement" in the cells #11A and #11B to be longer than the measurement cycle of the measurement process in the cell #11 with which the mobile station UE is currently communicating.

Modified Example 1

With reference to FIG. 8, a mobile communication system according to Modified Example 1 of the present invention is described. The mobile communication system according to Modified Example 1 is described below by focusing on differences from the mobile communication system according to the first embodiment described above.

In the mobile communication system according to Modified Example 1, a setting unit 11 in a radio base station eNB is configured to set a measurement cycle for "Inter-Frequency Measurement" for "measCycleScell-r10" set in "MeasObjectEUTRA" in "Measurement Configuration" as shown in FIG. 8.

Note that, in current LTE, the measurement cycle for "Inter-Frequency Measurement" in a cell set as Scell but not activated can be set for "measCycleScell-r10" described above.

On the other hand, as shown in FIG. 8, the mobile communication system according to this embodiment is extended to be able to set not only the measurement cycle for "Inter-Frequency Measurement" in the cell set as Scell but not activated for "measCycleScell-r10" described above but also the measurement cycle for "Inter-Frequency Measurement" in a cell not set as Scell.

Meanwhile, in the mobile communication system according to Modified Example 1, a receiver unit 21 in a mobile station UE is configured to acquire a measurement cycle (sf160/160 subframe to sf1280/1280 subframe) set for "measCycleScell-r10" set in "MeasObjectEUTRA" in "Measurement Configuration" as the measurement cycle for "Inter-Frequency Measurement".

The mobile communication system according to Modified Example 1 can achieve the same effects as those achieved by the mobile communication system according to the first embodiment described above without adding an information element to the format of "Measurement Configuration" specified in current LTE.

The above-described features of the embodiment may also be expressed as follows.

A first feature of the embodiment is summarized as a mobile communication method including: a step A of a radio base station eNB notifying a mobile station UE of a measurement cycle for "Inter-Frequency Measurement" for each measurement frequency; and a step B of the mobile station UE performing a measurement process in the cells #11A and #11B having frequencies f2 and f3 different from that of the cell #11 to which the mobile station UE is currently connected, based on the measurement frequency and the measurement cycle for "Inter-Frequency Measurement".

In the first feature of the embodiment, in the step A, the radio base station eNB notifies the mobile station UE in a state where no Scell is set of the measurement cycle for "Inter-Frequency Measurement" for each measurement frequency.

In the first feature of the embodiment, in the step A, when no Scell (secondary cell) is set for the mobile station UE, the radio base station eNB may notify the mobile station eNB of the measurement cycle for "Inter-Frequency Measurement" for hot-spot cells. And in the step B, the mobile station UE may perform a measurement process in a macrocell to which the mobile station UE is currently connected, based on a common measurement cycle for "Inter-Frequency Measurement", and also perform a measurement process in each hot-spot cell different from the macrocell based on the measurement cycle for "Inter-Frequency Measurement" for hot-spot cells.

In the first feature of the embodiment, in the step A, the radio base station eNB may notify by setting the measurement cycle for "Inter-Frequency Measurement" in "measGapConfig" in "MeasObjectEUTRA (information element which specifies measurement target)" in "Measurement Configuration (measurement setting signal)".

In the first feature of the embodiment, in the step B, the mobile station UE may perform a measurement process in the cells #11A and #11B having frequencies f2 and f3 different from that of the cell #11 to which the mobile station UE is currently connected, using "measCycleScell-r10 (measurement cycle for secondary cell)" set in "MeasObjectEUTRA" in "Measurement Configuration".

A second feature of the embodiment is summarized as a radio base station eNB including: a transmitter unit 12 configured to notify a mobile station UE of a measurement cycle for "Inter-Frequency Measurement" for each measurement frequency.

In the second feature of the embodiment, the transmitter unit 12 may be configured to notify the mobile station UE in a state where no Scell is set of the measurement cycle for "Inter-Frequency Measurement" for each measurement frequency.

In the second feature of the embodiment, the transmitter unit 12 may be configured to notify the mobile station UE in a state where no Scell is set of the measurement cycle for "Inter-Frequency Measurement" for hot-spot cells, for each of measurement frequencies operated in the hot-spot cells.

In the second feature of the embodiment, the transmitter unit 14 may be configured to notify the measurement cycle for "Inter-Frequency Measurement" for each measurement frequency by transmitting "Measurement Configuration" including "MeasOBjectEUTRA" including "measGapConfig" set the measurement cycle for "Inter-Frequency Measurement".

A third feature of the embodiment is summarized as a mobile station including: a receiver unit 21 configured to acquire a measurement cycle for "Inter-Frequency Measurement" for each measurement frequency from a radio base station eNB; and a measurement unit 22 configured to perform a measurement process in the cells #11A and #11B having frequencies f2 and f3 different from that of the cell #11 to which the mobile station UE is currently connected.

In the third feature of the embodiment, when no Scell is set for the mobile station UE, the receiver unit 21 may be configured to acquire the measurement cycle for "Inter-Frequency Measurement" for each measurement frequency from the radio base station eNB.

In the third feature of the embodiment, when no Scell is set for the mobile station UE, the receiver unit 21 may be configured to acquire the measurement cycle for "Inter-Frequency Measurement" for hot-spot cells, for each of measurement frequencies operated in the hot-spot cells from the radio base station eNB, and the measurement unit 22 may be configured to perform a measurement process in a macrocell to which the mobile station UE is currently connected, based on a common measurement cycle for "Inter-Frequency Measurement", and also perform a measurement process in a hot-spot cell different from the macrocell based on the measurement cycle for "Inter-Frequency Measurement" for hot-spot cells.

In the third feature of the embodiment, the receiver unit 21 may be configured to acquire the measurement cycle for "Inter-Frequency Measurement" from "measGapConfig" in "MeasObjectEUTRA" in "Measurement Configuration".

In the third feature of the embodiment, the receiver unit 21 may be configured to acquire a measurement cycle set in "measCycleScell-r10" set in "MeasObjectEUTRA" in "Measurement Configration", as the measurement cycle for "Inter-Frequency Measurement".

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-017366 (filed on Jan. 30, 2012) is incorporated by reference in the present specification.

INDUSTRIAL APPLICABILITY

As described above, the present invention can provide a mobile communication method, a radio base station and a mobile station which are capable of setting different measurement cycles of a measurement process for respective measurement frequencies in current LTE.

EXPLANATION OF THE REFERENCE NUMERALS

UE mobile station
eNB radio base station
11 setting unit
12 transmitter unit
21 receiver unit
22 measurement unit

The invention claimed is:

1. A mobile communication method comprising:
a step A of a radio base station notifying a mobile station of a measurement cycle for inter-frequency measurement for each measurement frequency; and
a step B of the mobile station performing a measurement process in a cell having a frequency different from that of a cell to which the mobile station is currently connected, based on the measurement frequency and the measurement cycle for inter-frequency measurement,
wherein in the step A, the radio base station notifies the mobile station in a state where no secondary cell is set of the measurement cycle for inter-frequency measurement for each measurement frequency.

2. The mobile communication method according to claim 1, wherein
in the step A, the radio base station notifies the mobile station in a state where no secondary cell is set of the measurement cycle for inter-frequency measurement for hot-spot cells, for each of measurement frequencies operated in the hot-spot cells, and
in the step B, the mobile station performs a measurement process in a macrocell to which the mobile station is currently connected, based on a common measurement cycle for inter-frequency measurement, and also performs a measurement process in each hot-spot cell different from the macrocell based on the measurement cycle for inter-frequency measurement for hot-spot cells.

3. The mobile communication method according to claim 1, wherein in the step A, the radio base station notifies by setting the measurement cycle for inter-frequency measurement in an information element which specifies a measurement target in a measurement setting signal.

4. The mobile communication method according to claim 1, wherein in the step B, the mobile station performs the measurement process using a measurement cycle for a secondary cell set in an information element which specifies a measurement target in a measurement setting signal.

5. A radio base station comprising:
a setting unit sets a measurement cycle for inter-frequency measurement for each measurement frequency; and
a transmitter notifies a mobile station of the measurement cycle for inter-frequency measurement for each measurement frequency,
wherein the transmitter notifies the mobile station in a state where no secondary cell is set of the measurement cycle for inter-frequency measurement for each measurement frequency.

6. The radio base station according to claim 5, wherein the transmitter notifies the mobile station in a state where no secondary cell is set of the measurement cycle for inter-frequency measurement for hot-spot cells, for each of measurement frequencies operated in the hot-spot cells.

7. The radio base station according to claim 5, wherein the transmitter notifies the measurement cycle for inter-frequency measurement for each measurement frequency by transmitting a measurement setting signal in which the measurement cycle set for inter-frequency measurement is set in an information element specifying a measurement target.

8. A mobile station comprising:
a receiver acquires a measurement cycle for inter-frequency measurement for each measurement frequency from a radio base station; and
a measurement unit performs a measurement process in a cell having a frequency different from that of a cell to which the mobile station is currently connected, based on the measurement frequency and the measurement cycle for inter-frequency measurement,
wherein when no secondary cell is set for the mobile station, the receiver acquires the measurement cycle for inter-frequency measurement for each measurement frequency from the radio base station.

9. The mobile station according to claim 8, wherein when no secondary cell is set for the mobile station, the receiver acquires the measurement cycle for inter-frequency measurement for hot-spot cells, for each of measurement frequencies operated in the hot-spot cells from the radio base station, and the measurement unit performs a measurement process in a macrocell to which the mobile station is currently connected, based on a common measurement cycle for inter-frequency measurement, and also performs a measurement process in a hot-spot cell different from the macrocell based on the measurement cycle for inter-frequency measurement for hot-spot cells.

10. The mobile station according to claim 8, wherein the receiver acquires the measurement cycle for inter-frequency measurement from an information element which specifies a measurement target in a measurement setting signal.

11. The mobile station according to claim 8, wherein the receiver acquires a measurement cycle for a secondary cell set in an information element which specifies a measurement target in a measurement setting signal, as the measurement cycle for inter-frequency measurement.

* * * * *